United States Patent
Rowe et al.

(10) Patent No.: US 12,391,836 B2
(45) Date of Patent: Aug. 19, 2025

(54) LIDAR REFLECTIVE MATERIAL AND MARKING SYSTEM

(71) Applicant: Toyota Motor Engineering & Manufacturing North America, Inc., Plano, TX (US)

(72) Inventors: Michael P. Rowe, Pinckney, MI (US); Frederick W. Mau, II, McKinney, TX (US); Songtao Wu, Ann Arbor, MI (US); Debasish Banerjee, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 27 days.

(21) Appl. No.: 18/118,853

(22) Filed: Mar. 8, 2023

(65) Prior Publication Data

US 2024/0301215 A1    Sep. 12, 2024

(51) Int. Cl.
| | |
|---|---|
| C09D 5/33 | (2006.01) |
| C08K 3/04 | (2006.01) |
| C08K 3/22 | (2006.01) |
| C09D 5/02 | (2006.01) |
| C09D 7/20 | (2018.01) |
| C09D 7/40 | (2018.01) |

(Continued)

(52) U.S. Cl.
CPC ............. *C09D 5/004* (2013.01); *C09D 5/021* (2013.01); *C09D 5/028* (2013.01); *C09D 7/20* (2018.01); *C09D 7/61* (2018.01); *C09D 7/67* (2018.01); *C09D 175/04* (2013.01); *C08K 3/04* (2013.01); *C08K 2003/2248* (2013.01); *C08K 2003/2265* (2013.01)

(58) Field of Classification Search
None
See application file for complete search history.

(56) References Cited

U.S. PATENT DOCUMENTS

| | | | |
|---|---|---|---|
| 8,842,015 | B2 | 9/2014 | Scott |
| 9,683,107 | B2 | 6/2017 | Milliken et al. |

(Continued)

FOREIGN PATENT DOCUMENTS

| | | |
|---|---|---|
| CA | 3147350 A1 | 4/2021 |
| CN | 103480377 B | 4/2015 |

(Continued)

OTHER PUBLICATIONS

"What is the Working Principle of Reflective Fabric?" Hangzhou Chinastars, https://www.chinareflective.com/faqs/How_does_reflective_fabric_work.html.

(Continued)

*Primary Examiner* — Michael G Miller
(74) *Attorney, Agent, or Firm* — Dinsmore & Shohl

(57) ABSTRACT

Disclosed here are a method of marking a dark-colored surface with a dark-colored LiDAR-reflective material and a marking composition comprising the dark-colored LiDAR-reflective material and a marking carrier. Particularly, the dark-colored LiDAR-reflective material comprises has a reflectivity in the visible spectrum of electromagnetic radiation that is ≤10% and a reflectivity in the near-IR and LiDAR spectrum of electromagnetic radiation that is ≥10%.

22 Claims, 4 Drawing Sheets

(51) Int. Cl.
  *C09D 7/61* (2018.01)
  *C09D 175/04* (2006.01)

(56) References Cited

U.S. PATENT DOCUMENTS

| | | | |
|---|---|---|---|
| 9,921,297 | B2 | 3/2018 | Jungwirth |
| 11,118,062 | B2 | 9/2021 | Banerjee et al. |
| 2002/0030742 | A1 | 3/2002 | Aman et al. |
| 2004/0261655 | A1* | 12/2004 | Newbacher ............ C09D 5/021 |
| | | | 106/31.15 |
| 2008/0134941 | A1* | 6/2008 | Sanada ................. C09C 1/22 |
| | | | 106/419 |
| 2015/0122146 | A1 | 5/2015 | Gruner et al. |
| 2017/0015836 | A1* | 1/2017 | Milliken ................ C09C 1/00 |
| 2020/0349338 | A1 | 11/2020 | Lagmanson |
| 2022/0012555 | A1 | 1/2022 | Duarte et al. |
| 2022/0195201 | A1* | 6/2022 | Wu ........................ C09C 3/063 |

FOREIGN PATENT DOCUMENTS

| | | |
|---|---|---|
| CN | 109270963 A | 1/2019 |
| WO | 2014070116 A1 | 5/2014 |
| WO | 2015153129 A1 | 10/2015 |
| WO | 2020021306 A1 | 1/2020 |

OTHER PUBLICATIONS

"Reflective Strips", Spacio Innovations, https://www.spacioinnovations.com/brilliant.html.
Kim, J.H. et al., "Design of Near Infrared Reflective Effective Pigment for LiDAR Detectable Paint," MRS Advances, vol. 5, Issue 11 (Energy and Environment), Jan. 21, 2020, pp. 515-522 (Abstract only).
International Search Report and Written Opinion for application PCT/US2021/041571 mail date Oct. 15, 2021 (14 pages).
Braga et al: "Copper oxide and niobium pentoxide supported on silica·alumina: Synthesis, characterization, and application on diesel soot oxidation", Journal of Catalysis, Academic Press, Duluth, MN, US, vol. 247, No. 1, Mar. 2, 2007 (Mar. 2, 2007), pp. 68-77, XP005907307, ISSN: 0021-9517, DOI: 10.1016/J.JCAT.2006.12.022.
Akgul Funda Aksoy et al: "Influence of thermal annealing on microstructural, morphological, optical properties and surface electronic structure of copper oxide thin films", Materials Chemistry and Physics, vol. 147, No. 3, Oct. 1, 2014 (Oct. 1, 2014), pp. 987-995, XP055846533, Switzerland, Taiwan, Republic of China ISSN: 0254-0584, DOI: 10.1016/j.matchemphys.2014.06.047.
Sekhar R: "Preparation of copper oxide thin film by the sol-gel-like dip technique and study of their structural and optical properties", Solar Energy Materials and Solar Cells, Elsevier Science Publishers, Amsterdam, NL, vol. 68, No. 3-4, Jun. 1, 2001 (Jun. 1, 2001), pp. 307-312, XP004230572, ISSN: 0927-0248, DOI: 10.1016/S0927-0248(00)00364-0.
Tangale Nilesh Pet Al: "Dehydrogenation of cyclohexanol over Cu/Al2O3catalysts prepared with different precipitating agents", Applied Catalysis A: General, Elsevier, Amsterdam, NL, vol. 467, Aug. 18, 2013 (Aug. 18, 2013), pp. 421-429, XP028758172, ISSN: 0926-860X, DOI: 10.1016/J.APCATA.2013.07.063.
Zhang Fan et al: "Effect of Al-containing precursors on Cu/ZnO/Al2O3 catalyst for methanol production", Fuel Processing Technology, vol. 178, Sep. 1, 2018 (Sep. 1, 2018), pp. 148-155, XP055847608, NL ISSN: 0378-3820, DOI: 10.1016/j.fuproc.2018.04.021.
Wu Songtao Et Al: "Pitch-Black Nanostructured Copper Oxide as an Alternative to Carbon Black for Autonomous Environments", Advanced Intelligent Systems, vol. 3, No. 9, Jun. 29, 2021 (Jun. 29, 2021), p. 2100049, XP055846672, DE ISSN: 2640-4567, DOI: 10.1002/aisy.202100049 Retrieved from the Internet: URL: https://onlinelibrary.wiley.com/doi/full-XML/10.1002/aisy.202100049>.
Prabu R. David, et al.: "Studies on copper oxide think films prepared by simple spray technique", Journal of Materials Science: Materials in Electronics, Chapman and Hall, London, GB, vol. 28, No. 9 Jan. 28, 2017 (Jan. 28, 2017), pp. 6754-6762, XPO36212815, ISSN: 0+57--4522, DOI: 10.1007/S10854-017-6371-2 [retrieved on Jan. 28, 2017] figures 2, 7.
Chang Ming-Hui, et al.: "Preparation of coper oxide nanoparticles and its application in nanoparticles and its application in nanofluid", Powder Technology, vol. 207, No. 1-3, Dec. 1, 2010 (Dec. 1, 2010)m pp. 378-386, xp055962407, Basel (CH) ISSN: 0032-5910, DOI: 10.1016/j. powtec.2010.11.022 p. 379 column 1, paragraph 2—p. 380, col. 1, paragraph 2—p. 380, col. 1, paragraph 2.2 table 2.
International Search Report and Written Opinion for Application No. PCT/US2022/032693, date of mailing Sep. 27, 2022 (13 pages).
Invitation to Pay Additional Fees dated Jun. 28, 2024, pertaining to Int'l Patent Application No. PCT/US2024/018868, 10 pgs.
International Search Report and Written Opinion for Application No. PCT/US2024/018868 mail dated Aug. 20, 2024 (19 pages).

* cited by examiner

Naked-eye view | LiDAR view

LIDAR REFLECTIVE MATERIAL AND MARKING SYSTEM

TECHNICAL FIELD

The present specification generally relates to methods of marking surfaces with LiDAR-reflective materials, compositions of the LiDAR-reflective materials, and to delivery systems comprising marking carriers and LiDAR-reflective materials.

BACKGROUND

LiDAR electromagnetic radiation (near infrared (IR), typically 905 nm or 1050 nm) is not visible to the human eye, but may be used to detect objects that reflect this electromagnetic radiation by LiDAR-detecting devices. However, this electromagnetic radiation generally gets absorbed in dark-colored materials. Accordingly, a need exists for methods of marking surfaces with dark-colored LiDAR-reflective materials to enable or enhance LiDAR detection and for compositions of LiDAR-reflective materials that can be applied to surfaces, and particularly to dark-colored surfaces.

SUMMARY

A first aspect includes a method of marking a surface with a LiDAR-reflective material, comprising: selecting a surface to be marked; applying the LiDAR-reflective material to the surface, wherein the LiDAR-reflective material comprises a reflectivity in the visible spectrum of electromagnetic radiation that is ≤10%; and a reflectivity in the near-IR and LiDAR spectrum of electromagnetic radiation that is ≥10%.

A second aspect includes the method of the first aspect, wherein applying the LiDAR-reflective material to the surface comprises applying a delivery system comprising the LiDAR-reflective material and a marking carrier to the surface.

A third aspect includes the method of the first or second aspects, wherein applying the LiDAR-reflective material to the surface comprises spraying the surface with the LiDAR-reflective material.

A fourth aspect includes the method of the first or second aspects, wherein applying the LiDAR-reflective material to the surface comprises applying the LiDAR-reflective material on the surface with an applicator.

A fifth aspect includes the method of the fourth aspect, wherein the applicator is selected from at least one of the group consisting of a stamp, a brush, a marker, a pen, a stylus, a roller, and a needle.

A sixth aspect includes the method of the first or second aspects, wherein applying the LiDAR-reflective material to the surface comprises contacting a membrane encasing the LiDAR-reflective material to the surface, wherein the membrane is selected from the group consisting of gelatin, polyethylene terephthalate (PET), polystyrene, gelatin, nylon, polycarbonate, epoxy, phenol formaldehyde resin, urethane, polyesters, vinyl esters, polyethylene, polypropylene, polyvinyl chloride, polymethyl methacrylate, acrylonitrile-butadiene-styrene (ABS), polydimethylsiloxane, polysulfide, or a combination of two or more thereof; and fracturing the membrane upon contact with the surface.

A seventh aspect includes the method of the first to sixth aspects, wherein the LiDAR-reflective material is applied to the surface as a unique marking design.

An eighth aspect includes the method of the seventh aspect, wherein the unique marking design is a glyph, bar code, or QR code.

A ninth aspect includes a marking composition, comprising: a LiDAR-reflective material; and a marking carrier, wherein the LiDAR-reflective material comprises a reflectivity in the visible spectrum of electromagnetic radiation that is ≤10%; and a reflectivity in the near-IR and LiDAR spectrum of electromagnetic radiation that is ≥10%.

A tenth aspect includes the marking composition of the ninth aspect, wherein the marking composition is encased in a membrane selected from the group consisting of gelatin, polyethylene terephthalate (PET), polystyrene, gelatin, nylon, polycarbonate, epoxy, phenol formaldehyde resin, urethane, polyesters, vinyl esters, polyethylene, polypropylene, polyvinyl chloride, polymethyl methacrylate, acrylonitrile-butadiene-styrene (ABS), polydimethylsiloxane, polysulfide, and combinations thereof.

An eleventh aspect includes the marking composition of the ninth aspect, wherein the composition further comprises a propellant selected from the group consisting of difluorochloromethane, dimethyl ether, methyl ethyl ether, tetrafluoroethane, heptafluoropropane, hydrofluoroolefin, low-molecular weight hydrocarbons, butane, isobutene, propane, nitrous oxide, carbon dioxide, nitrogen, and combinations thereof.

A twelfth aspect includes the marking composition of the ninth to eleventh aspects, wherein the marking carrier is a gas selected from the group consisting of argon, nitrogen, oxygen, difluorochloromethane, dimethyl ether, methyl ethyl ether, tetrafluoroethane, heptafluoropropane, hydrofluoroolefin, chlorofluorocarbons, low-molecular weight hydrocarbons, butane, isobutene, propane, nitrous oxide, carbon dioxide, and combinations thereof.

A thirteenth aspect includes the marking composition of the ninth to eleventh aspects, wherein the marking carrier is a fluid selected from the group consisting of water, acetone, methyl ethyl ketone, methyl isobutyl ketone, methyl amyl ketones, isophorene, diacetone alcohol, diisobutyl ketone, ethyl acetate, butyl acetate, isopropyl acetate, isobutyl acetate, glycol ether esters, propylene glycol mono methyl ether acetate, ethanol, butanol, propanol, ethylene glycol monobutyl ether, ethylene glycol mono-n-propyl ether, diethylene glycol monobutyl ether, propylene glycol mono methyl ether, propylene glycol n-butyl ether, dipropylene glycol n-butyl ether, and combinations thereof.

A fourteenth aspect includes the marking composition of the ninth to eleventh aspects, wherein the marking carrier is a polymer selected from the group consisting of gelatin, polyethylene terephthalate (PET), polystyrene, gelatin, nylon, polycarbonate, epoxy, phenol formaldehyde resin, urethane, polyesters, vinyl esters, polyethylene, polypropylene, polyvinyl chloride, polymethyl methacrylate, acrylonitrile-butadiene-styrene (ABS), polydimethylsiloxane, polysulfide, and combinations thereof.

The fifteenth aspect includes the marking composition of the ninth to eleventh aspects, wherein the marking carrier is a combination of a gas and a fluid, wherein the gas is selected from the group consisting of argon, nitrogen, oxygen, difluorochloromethane, dimethyl ether, methyl ethyl ether, tetrafluoroethane, heptafluoropropane, hydrofluoroolefin, chlorofluorocarbons, low-molecular weight hydrocarbons, butane, isobutene, propane, nitrous oxide, carbon dioxide, and combinations thereof; and the fluid is selected from the group consisting of water, acetone, methyl ethyl ketone, methyl isobutyl ketone, methyl amyl ketones, isophorene, diacetone alcohol, diisobutyl ketone, ethyl acetate, butyl acetate, isopropyl acetate, isobutyl acetate, glycol ether esters, propylene glycol mono methyl ether acetate, ethanol, butanol, propanol, ethylene glycol monobutyl ether, ethylene glycol mono-n-propyl ether, diethylene glycol monobutyl ether, propylene glycol mono methyl ether, propylene glycol n-butyl ether, dipropylene glycol n-butyl ether, and combinations thereof.

The sixteenth aspect includes the marking composition of the ninth to eleventh aspects, wherein the marking carrier is a combination of a fluid and a polymer, wherein the fluid is selected from the group consisting of water, acetone, methyl ethyl ketone, methyl isobutyl ketone, methyl amyl ketones, isophorene, diacetone alcohol, diisobutyl ketone, ethyl acetate, butyl acetate, isopropyl acetate, isobutyl acetate, glycol ether esters, propylene glycol mono methyl ether acetate, ethanol, butanol, propanol, ethylene glycol monobutyl ether, ethylene glycol mono-n-propyl ether, diethylene glycol monobutyl ether, propylene glycol mono methyl ether, propylene glycol n-butyl ether, dipropylene glycol n-butyl ether, and combinations thereof; and the polymer is selected from the group consisting of gelatin, polyethylene terephthalate (PET), polystyrene, gelatin, nylon, polycarbonate, epoxy, phenol formaldehyde resin, urethane, polyesters, vinyl esters, polyethylene, polypropylene, polyvinyl chloride, polymethyl methacrylate, acrylonitrile-butadiene-styrene (ABS), polydimethylsiloxane, polysulfide, and combinations thereof.

A seventeenth aspect includes the marking composition of the ninth to sixteenth aspects, wherein the LiDAR-reflective material comprises an average particle size that is from 5 nm to 15 nm; and a blackness $M_y$ that is from 130 to 170.

An eighteenth aspect includes the marking composition of the ninth to seventeenth aspects, wherein the LiDAR-reflective material comprises an average particle size that is from 8 nm to 12 nm.

A nineteenth aspect includes the marking composition of the ninth to eighteenth aspects, wherein the LiDAR-reflective material comprises a blackness $M_y$ that is from 150 to 170.

A twentieth aspect includes the marking composition of the ninth to nineteenth aspects, wherein the LiDAR-reflective material comprises a reflectivity in the visible spectrum of electromagnetic radiation that is ≤5%.

A twenty-first aspect includes the marking composition of the ninth to twentieth aspects, wherein the LiDAR-reflective material comprises a reflectivity in the near-IR and LiDAR spectrum of electromagnetic radiation that is ≥20%.

A twenty-second aspect includes the marking composition of the ninth to twenty-first aspects, wherein the LiDAR-reflective material comprises a dark-colored pigment selected from the group consisting of CuO crystallites, carbon black, chromium iron oxide and its derivatives, or a combination of two or more thereof.

A twenty-third aspect includes the marking composition of the twenty-second aspect, wherein the dark-colored pigment comprises CuO crystallites with a ratio of (−111)/(111) intensity that is from 0.5 to 1.5.

A twenty-forth aspect includes the marking composition of the twenty-second aspect, wherein the dark-colored pigment comprises CuO crystallites with a ratio of (−111)/(111) intensity that is from 0.9 to 1.1.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
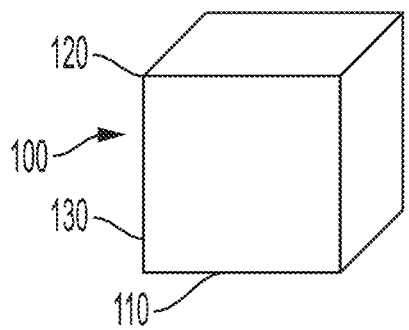
FIG. 1A graphically demonstrates LiDAR detection of a dark object.
Figure 1A:
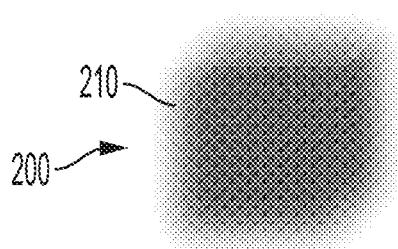

The methods disclosed and described herein mark a surface with a LiDAR-reflective material that reflects near-IR electromagnetic radiation, which includes LiDAR, having wavelengths greater than or equal to 800 nm and less than or equal to 2500 nm but is also dark-colored, such as dark brown or black. In embodiments, the methods disclosed and described herein include a delivery system comprising a LiDAR-reflective material and a marking carrier that can apply the LiDAR-reflective material to surfaces-such as, for example, portions of a vehicle, portions of structures, portions of documents, portions of textiles, and the like-so that near-IR and LiDAR detection systems can detect a surface coated with the LiDAR-reflective material even if where surface and the LiDAR-reflective material are both dark-colored.

As used herein, the term "near-IR electromagnetic radiation" refers to electromagnetic radiation with wavelengths greater than or equal to 800 nm and less than or equal to 2500 nm.

As used herein, the term "LiDAR" refers to electromagnetic radiation with wavelengths greater than or equal to 905 nm and less than or equal to 1550 nm.

As used herein, the term "visible spectrum" refers to electromagnetic radiation with wavelengths greater than or equal to 350 nm and less than or equal to 750 nm.

Accordingly, it is desired to be able to mark articles and structures with dark-colored LiDAR-reflective materials. Dark-colored LiDAR reflective material may be useful for marking dark-colored articles or structures in instances where the marking is not desired to be perceived by the unaided eye. For instance, dark-colored articles or structures that are to be marked with an image intended for a select group, but not the general public may be marked by the delivery system comprising the dark-colored LiDAR reflective material so that the marking is only perceptible to those viewing the marking through LiDAR-detecting equipment. In this case, if traditional light-colored LiDAR reflecting materials were used, anyone could see marking. An exemplary use may be, for example, a dark-colored structure that is desired to be detectable by an autonomous vehicle or robot, but the aesthetic of the dark-colored structure is not to be disturbed by a light-colored LiDAR reflecting material.

To date, the delivery systems for marking articles and structures with dark-colored LiDAR reflective materials have incorporated lighter-colored LiDAR reflective materials in a dark-colored carrier. Overall, these known systems are generally not able to achieve a balance of good LiDAR reflectivity and a dark color. The present disclosure addresses this by providing marking systems that apply dark-colored LiDAR reflective materials to articles and structures. The present disclosure additionally provides marking compositions that comprise the dark-colored LiDAR-reflective materials and a marking carriers. Embodiments illustrated herein are exemplary and are not intended to be exhaustive or to limit the scope of the claimed subject matter. Various components of the marking system and methods for using the marking system will now be disused.

The LiDAR-Reflective Material

Dark-colored LiDAR reflective material that can be used in systems and methods disclosed herein comprise a reflectivity in the visible spectrum of electromagnetic radiation that is ≤10% and a reflectivity in the near-IR and LiDAR spectrum of electromagnetic radiation that is ≥10%.

As discussed above, the performance and accuracy of LiDAR detection depends on the intensity of LiDAR lights reflected from the objects and received by the LiDAR system. However, dark-colored pigments and colorants (e.g. black pigments used in paints and other materials to provide a dark-color) absorb not only visible electromagnetic radiation to provide the dark color, but also absorb near-IR electromagnetic radiation with wavelengths of greater than about 750 nm, which includes LiDAR electromagnetic radiation.

Commonly used dark pigments include carbon black and chromium iron oxide. Carbon black is the standard for "pure black" color, which has a blackness ($M_y$) of about 165, measured by X-Rite spectrophotometer. However, carbon black absorbs electromagnetic radiation in all of the visible, IR, and near-IR (LiDAR) spectrums. Accordingly, the LiDAR reflectance of carbon black is near zero. Therefore, carbon black is not an ideal candidate for applications where IR or LiDAR reflection is desired. On the other hand, chromium iron oxide and its derivatives show high absorption in visible light yet reflect IR and/or LiDAR lights. Chromium iron oxide has a blackness that is around 142 or less. The reduced blackness of chromium iron oxide is notable compared to "pure black." Thus, a few commercial pigment products containing chromium iron oxide and its derivatives are available as "cool black" and have hints of red or blue in them, and they are not considered "pure black."

Accordingly, there is a need for a dark-colored LiDAR-reflective material that has a blackness similar to carbon black and that also reflects near-IR and LiDAR electromagnetic radiation. To meet this need, a dark-colored LiDAR-reflective material is required to have a very sharp increase in reflectivity just outside of the visible spectrum of electromagnetic radiation.

This sharp reflectivity or absorption transition is generally determined by the bandgap of a material. As used herein, the "bandgap" generally refers to the energy difference (in electron volts or eV) between the top of the valence band (VB) and the bottom of the conduction band (CB). The VB refers to the highest-energy, electron-filled band, and the CB refers to the lowest-energy, electron-vacant band. The bandgap is generally the threshold energy that a VB electron can absorb in order to move from the VB to the CB. In optics, the threshold energy refers to the photon energy (E in eV) or wavelength (λ in nm) that can be absorbed by a material. Note that photon energy is inversely proportional to photon wavelength by the equation:

$$E(\text{eV}) = \frac{1239.8}{\lambda(\text{nm})} \tag{1}$$

Therefore, without being bound by any particular theory, the bandgap determines what wavelengths or what portion of the electromagnetic spectrum the material can absorb. In view of this, a promising dark-colored, LiDAR-reflective material is required to have a bandgap of from 1.5 eV to 1.8 eV (about from 688 nm to 826 nm) to both absorb electromagnetic radiation in the visible spectrum and transmit or reflect LiDAR.

The bandgap of a material can be manipulated by, for example, adding dopants in instances of semiconductors, reducing particle size and shape in instances of nanoparticles, controlling crystal structures in instances of crystallites, and many others. One dark-colored material of interest for bandgap engineering for LiDAR applications is copper (II) oxide or cupric oxide (CuO). It has been found that the bandgap of CuO is tunable by means of different approaches such as dopants, synthesis solvent and stoichiometry, nanoparticle size, and the shape of the nanostructure as well as the morphology.

CuO is a monoclinic p-type semiconductor with its indirect bandgap having been experimentally determined to be in the range of 1.2 eV to 2.2 eV. CuO is a black-colored solid material in its natural state. However, not all copper oxides have this black color. Namely, another stable oxide of copper is cuprous oxide ($Cu_2O$) that is a red solid in its natural state. CuO is a product of copper mining and the precursor to many other copper-containing products and chemical compounds. CuO is commonly used as a pigment, such as in ceramics, glazes, and the like, and can be used to provide a high quality black finish.

However, without manipulation, bulk CuO has a reported bandgap of 2.0 eV, which is outside of the 1.2 eV to 1.8 eV required to absorb electromagnetic radiation in the visible spectrum and reflect electromagnetic radiation in the near-IR and LiDAR spectrum. Bulk CuO also has a blackness $M_y$ value of 128, significantly lower than the blackness of about 165 for carbon black. When manipulating CuO to have a bandgap that is more amenable to reflecting electromagnetic radiation in the near-IR or LiDAR spectrum, the color of the CuO degrades to a brownish black, which is not suitable for certain applications, such as in an automotive paint, textiles, and the like.

On the other hand, without being bound by any particular theory, it is believed that crystallites of CuO may be engineered to have both superior blackness in the visible spectrum of electromagnetic radiation and high reflectivity in near-IR and LiDAR electromagnetic radiation wavelengths. The CuO nanoparticles may be produced by processing CuO using mechanical methods such as ball milling, jet milling, and the like. These CuO nanoparticles are transmissive in the IR wavelength range and absorptive in the visible wavelength range. In addition, the CuO nanoparticles may have a reflectivity in the visible range that is less than 10% and thus the CuO nanoparticles operate as a black pigment. By manipulating the CuO, it has been found that one can form CuO crystallites with a sharp transition of absorbance near 700 nm (about 1.77 eV) wavelength light. These CuO crystallites can be made to be indistinguishable from carbon black with the same degree of measured blackness ($M_y$ value 135.5), but these the nanocrystalline CuO have 1500% better detectability by LiDAR than carbon black.

Without being bound by any particular theory, it is believed that the sharp transition of CuO crystallites is attributable to the near-unity ratio of (-111)/(111) the crystal facets and a crystal size of around 100 Å for the (-111) plane. In particular, it is believed that the (111) plane has a valance band (VB) maximum edge near 1.2 eV (or -1030 nm) with a bandgap energy of 1.5 eV, while (-111) plane has a slightly larger VB maximum edge around 2.1 eV (or -620 nm) with a slightly larger bandgap energy of 1.6 eV. Accordingly, visual observation indicates that the (-111) plane is the major cause for the visible reflection as it starts from a larger VB maximum edge around 620 nm. Therefore, the smaller ratio of (-111)/(111) or the smaller crystallite size of the (-111) plane would potentially lead to a higher blackness level, while a larger ratio and crystallite size would benefit near-IR reflectivity. In other words, the ratio of (-111)/(111) planes in the crystallite phases and the average crystallite size are the two key indicators for guidance.

Embodiments of the LiDAR-reflective material used to form the marking composition will now be described.

Generally, the LiDAR-reflective material comprises a reflectivity in the visible spectrum of electromagnetic radiation that is less than or equal to 10%; and a reflectivity in the near-IR and LiDAR spectrum of electromagnetic radiation that is greater than or equal to 10%.

In embodiments, the LiDAR-reflective materials that may be used to form the marking composition comprise a reflectivity in the visible spectrum of electromagnetic radiation that is less than or equal to 10%, such as less than or equal to 9.0%, less than or equal to 8.0%, less than or equal to 7.0%, less than or equal to 6.0%, less than or equal to 5.0%, less than or equal to 4.0%, less than or equal to 3.0%, less than or equal to 2.0%, less than or equal to 1.0%, or less than or equal to 0.5%, less than or equal to 0.1%.

In embodiments, the LiDAR-reflective materials described herein have a reflectivity in the near-IR and LiDAR spectrum of electromagnetic radiation that is greater than or equal to 10%, such as greater than or equal to 15%, greater than or equal to 20%, greater than or equal to 25%, greater than or equal to 30%, greater than or equal to 35%, greater than or equal to 40%, greater than or equal to 45%, greater than or equal to 50%, greater than or equal to 55%, or greater than or equal to 60%. In one or more embodiments, the LiDAR-reflective materials have a reflectivity in the near-IR and LiDAR spectrum of electromagnetic radiation that is greater than or equal to 10% and less than or equal to 80%, such as greater than or equal to 15% and less than or equal to 80%, greater than or equal to 20% and less than or equal to 80%, greater than or equal to 25% and less than or equal to 80%, greater than or equal to 30% and less than or equal to 80%, greater than or equal to 35% and less than or equal to 80%, greater than or equal to 40% and less than or equal to 80%, greater than or equal to 45% and less than or equal to 80%, greater than or equal to 50% and less than or equal to 80%, greater than or equal to 55% and less than or equal to 80%, greater than or equal to 60% and less than or equal to 80%, greater than or equal to 65% and less than or equal to 80%, greater than or equal to 70% and less than or equal to 80%, or greater than or equal to 75% and less than or equal to 80%.

In embodiments, the LiDAR reflective materials have a blackness ($M_y$) that is greater than or equal to 130 and less than or equal to 170, such as greater than or equal to 135 and less than or equal to 170, greater than or equal to 140 and less than or equal to 170, greater than or equal to 145 and less than or equal to 170, greater than or equal to 150 and less than or equal to 170, greater than or equal to 155 and less than or equal to 170, greater than or equal to 160 and less than or equal to 170, greater than or equal to 165 and less than or equal to 170, greater than or equal to 130 and less than or equal to 165, greater than or equal to 135 and less than or equal to 165, greater than or equal to 140 and less than or equal to 165, greater than or equal to 145 and less than or equal to 165, greater than or equal to 150 and less than or equal to 165, greater than or equal to 155 and less than or equal to 165, or greater than or equal to 160 and less than or equal to 165.

In embodiments, the LiDAR reflective materials may have an average particle size that is greater than or equal to 5 nm and less than or equal to 2,000 nm, such as greater than or equal to 6 nm and less than or equal to 2,000 nm, greater than or equal to 7 nm and less than or equal to 2,000 nm, greater than or equal to 8 nm and less than or equal to 2,000 nm, greater than or equal to 9 nm and less than or equal to 2,000 nm, greater than or equal to 10 nm and less than or equal to 2,000 nm, greater than or equal to 11 nm and less than or equal to 2,000 nm, greater than or equal to 12 nm and less than or equal to 2,000 nm, greater than or equal to 13 nm and less than or equal to 2,000 nm, greater than or equal to 14 nm and less than or equal to 2,000 nm, greater than or equal to 15 nm and less than or equal to 2,000 nm, greater than or equal to 50 nm and less than or equal to 2,000 nm, greater than or equal to 100 nm and less than or equal to 2,000 nm, greater than or equal to 200 nm and less than or equal to 2,000 nm, greater than or equal to 500 nm and less than or equal to 2,000 nm, greater than or equal to 1,000 nm and less than or equal to 2,000 nm, greater than or equal to 1,500 nm and less than or equal to 2,000 nm, greater than or equal to 5 nm and less than or equal to 1,500 nm, greater than or equal to 6 nm and less than or equal to 1,500 nm, greater than or equal to 7 nm and less than or equal to 1,500 nm, greater than or equal to 8 nm and less than or equal to 1,500 nm, greater than or equal to 9 nm and less than or equal to 1,500 nm, greater than or equal to 10 nm and less than or equal to 1,500 nm, greater than or equal to 11 nm and less than or equal to 1,500 nm, greater than or equal to 12 nm and less than or equal to 1,500 nm, greater than or equal to 13 nm and less than or equal to 1,500 nm, greater than or equal to 14 nm and less than or equal to 1,500 nm, greater than or equal to 15 nm and less than or equal to 1,500 nm, greater than or equal to 50 nm and less than or equal to 1,500 nm, greater than or equal to 100 nm and less than or equal to 1,500 nm, greater than or equal to 200 nm and less than or equal to 1,500 nm, or greater than or equal to 500 nm and less than or equal to 1,500 nm, greater than or equal to 1,000 nm and less than or equal to 1,500 nm.

Embodiments of the LiDAR-reflective material where the dark-colored pigment comprises CuO crystallites will now be described.

In embodiments, CuO crystallites have a ratio of (−111)/(111) that may be greater than or equal to 0.8 and less than or equal to 1.3, such as greater than or equal to 0.9 and less than or equal to 1.3, greater than or equal to 1.0 and less than or equal to 1.3, greater than or equal to 1.1 and less than or equal to 1.3, greater than or equal to 1.2 and less than or equal to 1.3, greater than or equal to 0.8 and less than or equal to 1.2, greater than or equal to 0.9 and less than or equal to 1.2, greater than or equal to 1.0 and less than or equal to 1.2, greater than or equal to 1.1 and less than or equal to 1.2, greater than or equal to 0.8 and less than or equal to 1.1, greater than or equal to 0.9 and less than or equal to 1.1, greater than or equal to 1.0 and less than or equal to 1.1, greater than or equal to 0.8 and less than or equal to 1.0, greater than or equal to 0.9 and less than or equal to 1.0, or greater than or equal to 0.8 and less than or equal to 0.9.

By reducing the size of CuO crystallites, such as to the average particle sizes disclosed below, the band gap of the CuO decreases. In embodiments, the band gap as measured by X-ray photoelectron spectroscopy (XPS) of the CuO nanoparticles is greater than or equal to 1.2 eV and less than or equal to 1.8 eV, such as greater than or equal to 1.3 eV and less than or equal to 1.8 eV, greater than or equal to 1.4 eV and less than or equal to 1.8 eV, greater than or equal to 1.5 eV and less than or equal to 1.8 eV, greater than or equal to 1.6 eV and less than or equal to 1.8 eV, greater than or equal to 1.7 eV and less than or equal to 1.8 eV, is greater than or equal to 1.2 eV and less than or equal to 1.7 eV, such as greater than or equal to 1.3 eV and less than or equal to 1.7 eV, greater than or equal to 1.4 eV and less than or equal to 1.7 eV, greater than or equal to 1.5 eV and less than or equal to 1.7 eV, greater than or equal to 1.6 eV and less than or equal to 1.7 eV, greater than or equal to 1.2 eV and less than or equal to 1.6 eV, such as greater than or equal to 1.3 eV and less than or equal to 1.6 eV, greater than or equal to 1.4 eV and less than or equal to 1.6 eV, greater than or equal to 1.5 eV and less than or equal to 1.6 eV, greater than or equal to 1.2 eV and less than or equal to 1.5 eV, such as greater than or equal to 1.3 eV and less than or equal to 1.5 eV, greater than or equal to 1.4 eV and less than or equal to 1.5 eV, greater than or equal to 1.2 eV and less than or equal to 1.4 eV, such as greater than or equal to 1.3 eV and less than or equal to 1.4 eV, or greater than or equal to 1.2 eV and less than or equal to 1.3 eV.

Without being bound by any particular theory, it is believed that the smaller the average crystal size of the CuO nanoparticles, the lower the band gap of the CuO nanoparticles will be. Thus, by reducing bulk CuO particles to CuO nanoparticles according to embodiments disclosed and described herein, the band gap of the CuO nanoparticles is within the range that will reflect electromagnetic radiation within the near-IR and LiDAR spectrum, such as having a band gap that is between 1.5 eV and 2.0 eV.

In embodiments, the CuO crystallites may have an average particle size that is greater than or equal to 5 nm and less than or equal to 15 nm, such as greater than or equal to 6 nm and less than or equal to 15 nm, greater than or equal to 7 nm and less than or equal to 15 nm, greater than or equal to 8 nm and less than or equal to 15 nm, greater than or equal to 9 nm and less than or equal to 15 nm, greater than or equal to 10 nm and less than or equal to 15 nm, greater than or equal to 11 nm and less than or equal to 15 nm, greater than or equal to 12 nm and less than or equal to 15 nm, greater than or equal to 13 nm and less than or equal to 15 nm, greater than or equal to 14 nm and less than or equal to 15 nm, greater than or equal to 5 nm and less than or equal to 14 nm, greater than or equal to 6 nm and less than or equal to 14 nm, greater than or equal to 7 nm and less than or equal to 14 nm, greater than or equal to 8 nm and less than or equal to 14 nm, greater than or equal to 9 nm and less than or equal to 14 nm, greater than or equal to 10 nm and less than or equal to 14 nm, greater than or equal to 11 nm and less than or equal to 14 nm, greater than or equal to 12 nm and less than or equal to 14 nm, greater than or equal to 13 nm and less than or equal to 14 nm, greater than or equal to 5 nm and less than or equal to 13 nm, greater than or equal to 6 nm and less than or equal to 13 nm, greater than or equal to 7 nm and less than or equal to 13 nm, greater than or equal to 8 nm and less than or equal to 13 nm, greater than or equal to 9 nm and less than or equal to 13 nm, greater than or equal to 10 nm and less than or equal to 13 nm, greater than or equal to 11 nm and less than or equal to 13 nm, greater than or equal to 12 nm and less than or equal to 13 nm, greater than or equal to 5 nm and less than or equal to 12 nm, greater than or equal to 6 nm and less than or equal to 12 nm, greater than or equal to 7 nm and less than or equal to 12 nm, greater than or equal to 8 nm and less than or equal to 12 nm, greater than or equal to 9 nm and less than or equal to 12 nm, greater than or equal to 10 nm and less than or equal to 12 nm, greater than or equal to 11 nm and less than or equal to 12 nm, greater than or equal to 5 nm and less than or equal to 11 nm, greater than or equal to 6 nm and less than or equal to 11 nm, greater than or equal to 7 nm and less than or equal to 11 nm, greater than or equal to 8 nm and less than or equal to 11 nm, greater than or equal to 9 nm and less than or equal to 11 nm, greater than or equal to 10 nm and less than or equal to 11 nm, greater than or equal to 5 nm and less than or equal to 10 nm, greater than or equal to 6 nm and less than or equal to 10 nm, greater than or equal to 7 nm and less than or equal to 10 nm, greater than or equal to 8 nm and less than or equal to 10 nm, greater than or equal to 9 nm and less than or equal to 10 nm, greater than or equal to 5 nm and less than or equal to 9 nm, greater than or equal to 6 nm and less than or equal to 9 nm, greater than or equal to 7 nm and less than or equal to 9 nm, greater than or equal to 8 nm and less than or equal to 9 nm, greater than or equal to 5 nm and less than or equal to 8 nm, greater than or equal to 6 nm and less than or equal to 8 nm, greater than or equal to 7 nm and less than or equal to 8 nm, greater than or equal to 5 nm and less than or equal to 7 nm, greater than or equal to 6 nm and less than or equal to 7 nm, or greater than or equal to 5 nm and less than or equal to 6 nm.

The blackness $M_y$ (i.e., a measure of blackness) of the CuO crystallites is, in embodiments, greater than or equal to 130 and less than or equal to 170, such as greater than or equal to 135 and less than or equal to 170, greater than or equal to 140 and less than or equal to 170, greater than or equal to 145 and less than or equal to 170, greater than or equal to 150 and less than or equal to 170, greater than or equal to 155 and less than or equal to 170, greater than or equal to 160 and less than or equal to 170, greater than or equal to 165 and less than or equal to 170, greater than or equal to 130 and less than or equal to 165, greater than or equal to 135 and less than or equal to 165, greater than or equal to 140 and less than or equal to 165, greater than or equal to 145 and less than or equal to 165, greater than or equal to 150 and less than or equal to 165, greater than or equal to 155 and less than or equal to 165, or greater than or equal to 160 and less than or equal to 165.

Copper oxide crystallites according to embodiments disclosed and described herein have a reflectivity in the visible spectrum of electromagnetic radiation that is less than or equal to 10.0%, such as less than or equal to 9.0%, less than or equal to 8.0%, less than or equal to 7.0%, less than or equal to 6.0%, less than or equal to 5.0%, less than or equal to 4.0%, less than or equal to 3.0%, less than or equal to 2.0%, less than or equal to 1.0%, or less than or equal to 0.5%.

Copper oxide crystallites according to embodiments disclosed and described herein have a reflectivity in the near-IR and LiDAR spectrum of electromagnetic radiation that is greater than or equal to 10%, such as greater than or equal to 15%, greater than or equal to 20%, greater than or equal to 25%, greater than or equal to 30%, greater than or equal to 35%, greater than or equal to 40%, greater than or equal to 45%, greater than or equal to 50%, greater than or equal to 55%, or greater than or equal to 60%. In one or more embodiments, the copper oxide crystallites have a reflectivity in the near-IR and LiDAR spectrum of electromagnetic radiation that is greater than or equal to 10% and less than or equal to 60%, such as greater than or equal to 15% and less than or equal to 60%, greater than or equal to 20% and less than or equal to 60%, greater than or equal to 25% and less than or equal to 60%, greater than or equal to 30% and less than or equal to 60%, greater than or equal to 35% and less than or equal to 60%, greater than or equal to 40% and less than or equal to 60%, greater than or equal to 45% and less than or equal to 60%, greater than or equal to 50% and less than or equal to 60%, or greater than or equal to 55% and less than or equal to 60%.

Combining CuO crystallites with carbon black, chromium iron oxide and its derivatives, or combinations thereof may further improve the blackness or near-IR reflectivity of the dark-colored pigment. Embodiments of the LiDAR-reflective material where the dark-colored pigment comprises CuO crystallites and at least one selected from the group consisting of carbon black, chromium iron oxide and its derivatives, or combinations thereof will now be described.

In embodiments, the dark-colored pigment is a core-shell system comprising an inner and an outer shell. The core consists of carbon black or chromium iron oxide and its derivatives and the shell consists of CuO crystallites. The CuO crystallite shell reflects near-IR and LiDAR radiation and absorbs visible radiation. Where the pigment has a core consists of carbon black, residual visible radiation that passes through the CuO crystallite shell may be further absorbed by the carbon black core and result in increased blackness. Where the pigment has a core consists of chromium iron oxide and its derivatives, residual near-IR and LiDAR radiations that passed through CuO crystallite shell may be reflected by the chromium iron oxide core and result in increased reflectivity in the near IR and LiDAR wavelengths.

The Marking Carrier

LiDAR reflective materials are generally solids. While fine powders of the LiDAR reflective material may be directly applied to a surface by brushing, electrostatic spraying, or the like, pigments are often used with additional marking carriers to expand available means of applications such as painting, wet spraying, and others. As such, the marking methods discussed herein may further comprise applying a delivery system comprising the LiDAR-reflective material and a marking carrier to a surface. Marking carriers disclosed herein are agents that assist and facilitate the application of LiDAR-reflective materials to selected surfaces.

In general, surface marking is a method that comprises subjecting a surface of an object to a layer of a marking material (e.g. LiDAR-reflective materials) and retaining the layer of the marking material to the surface of the object for intended applications (e.g. LiDAR detection). A wide variety of surface marking methods are available, from simple methods—such as, pen writing, brush painting, and aerosol spraying—to more advanced techniques—such as, thermal spraying, solution deposition, laser deposition, electrochemical deposition, electrostatic deposition, and more. However, reliable marking methods vary with the types (e.g. metal or nonmetal) and characteristics (e.g. porous, hydrophilic, or hydrophobic) of the selected surfaces. Further, different methods or techniques require different material states-liquid, solid (including molten), and gas—and different material properties—concentration, viscosity, density, melting point, boiling point, and others. For example, simple spraying generally requires the marking material in liquid state and thermal spraying requires the marking material in molten state.

After applying the marking material to the surface, many applications including LiDAR detection require the marking layer to be retained on the surface permanently or temporarily for minutes, hours, or days for the intended applications to be operable. The retention of the marking material on the surface may be achieved by physical interaction (e.g. electrostatic interaction) or by chemical bonding (e.g. surface modification). For example, ultrafine carbon black powders may adhere to a glass surface using electrostatic force and hydrophilic surface modifiers may form hydrogen bonds to connect pigments with the hydroxyl groups on glass surface. Accordingly, a number of marking carriers may be required based on the intended application.

According to embodiments, the marking carrier may be a fluid, a polymer, a gas, or combinations thereof. Each of these marking carriers will be discussed in more detail below.

Embodiments of the fluidic marking carrier will now be described. The LiDAR-reflective material disclosed above may be incorporated into a fluidic marking carrier, such as a solvent, that allows the LiDAR-reflective material to be sprayed or applied with a stamp, a brush, a marker, a pen, a stylus, a roller, a needle, or the like. In embodiments, the solvent containing the LiDAR-reflective material may be present in a pressurized container or in a container further including a propellant so that the solvent containing the LiDAR-reflective material may be applied as an aerosol (similar to spray paints). In other embodiments, the solvent including the LiDAR-reflective material may be absorbed into an absorbent material so that it can be applied by a physical applicator, such as a wooden or rubber stamp. In embodiments, the stamp may have a unique design, such as for example a glyph, QR code, bar code, or the like. Other marking carriers may include a liquid solvent containing the LiDAR-reflective material so that the solvent containing the LiDAR-reflective material may be applied by a brush, marker, pen or the like. The viscosity of the liquid solvent containing the LiDAR-reflective material can vary depending on the desired end use. In embodiments, the liquid solvent containing the LiDAR-reflective material may have high viscosity and appear as a sticky or slimy substance. By incorporating the LiDAR-reflective material in a solvent, the application of the LiDAR-reflective material to an article or structure may be controlled so that the LiDAR-reflective material may be more easily applied in a design by the user. In this way, an image or design may be nearly invisible to the naked eye, but is readily perceived by a LiDAR detecting device.

Forming the solvent including the LiDAR-reflective material includes combining the LiDAR-reflective material with one or more solvent system to form a LiDAR-reflective material doped solvent. In embodiments, the LiDAR-reflective material doped solvent may be one or more LiDAR-reflective material doped suspending fluids, or one or more LiDAR-reflective material doped suspending gels. For example, in embodiments, the solvent may be a ketone (such as acetone, methyl ethyl ketone, methyl isobutyl ketone, methyl amyl ketones, isophorene, diacetone alcohol, diisobutyl ketone, or the like), ester (such as ethyl acetate, butyl acetate, isopropyl acetate, isobutyl acetate, glycol ether esters, propylene glycol mono methyl ether acetate, and the like), alcohols (such as ethanol, butanol, propanol, and the like), or glycol ethers (such as ethylene glycol monobutyl ether, ethylene glycol mono-n-propyl ether, diethylene glycol monobutyl ether, propylene glycol mono methyl ether, propylene glycol n-butyl ether, dipropylene glycol n-butyl ether, and the like). Of course, combinations of solvents may be used as desired. Various additives may be included in the solvent to enhance the properties of the solvent, such as thickeners, stabilizers, emulsifiers, dispersing agent, and the like.

The solvent containing the LiDAR-reflective material may also be dosed and encased in a membrane for long-range application of the LiDAR-reflective material. Optionally, the membrane may be designed to fracture upon impact with an article or structure at an elevated force so that the solvent containing the LiDAR-reflective material is applied to the article or structure upon impact. These membranes may be made from plastic (such as PET, polystyrene, and the like) or a gelatin-based membrane. The solvent-filled membrane may then be delivered by a pressurized delivery device that allows an article or structure to be marked by the LiDAR-reflective material-containing solvent from a distance.

In embodiments where the marking carrier is a fluid, the marking carrier is a fluid selected from the group consisting of water, acetone, methyl ethyl ketone, methyl isobutyl ketone, methyl amyl ketones, isophorene, diacetone alcohol, diisobutyl ketone, ethyl acetate, butyl acetate, isopropyl acetate, isobutyl acetate, glycol ether esters, propylene glycol mono methyl ether acetate, ethanol, butanol, propanol, ethylene glycol monobutyl ether, ethylene glycol mono-n-propyl ether, diethylene glycol monobutyl ether, propylene glycol mono methyl ether, propylene glycol n-butyl ether, dipropylene glycol n-butyl ether, and combinations thereof.

The fluidic marking carrier has boiling point at 760 mm Hg that is greater than or equal to 0° C. and less than or equal to 300° C., such as greater than or equal to 20° C. and less than or equal to 280° C., greater than or equal to 40° C. and less than or equal to 260° C., greater than or equal to 60° C. and less than or equal to 240° C., greater than or equal to 80° C. and less than or equal to 200° C., greater than or equal to 100° C. and less than or equal to 180° C., or greater than or equal to 120° C. and less than or equal to 160° C.

The LiDAR-reflective material can also be applied using a polymeric marking carrier, wherein the polymeric marking carrier will physically or chemically form a network to retain the LiDAR-reflective material as a film. The polymeric marking carrier can form the network by exposure to heat or light. Embodiments of the polymeric marking carrier will now be described.

In embodiments where the marking carrier is a polymer, the marking carrier may be a polymer selected from the group consisting of gelatin, polyethylene terephthalate (PET), polystyrene, gelatin, nylon, polycarbonate, epoxy, phenol formaldehyde resin, urethane, polyesters, vinyl esters, polyethylene, polypropylene, polyvinyl chloride, polymethyl methacrylate, acrylonitrile-butadiene-styrene (ABS), polydimethylsiloxane, polysulfide, and combinations thereof.

The polymeric marking carrier has tensile strength that is greater than or equal to 10 MPa and less than or equal to 220 MPa, such as greater than or equal to 20 MPa and less than or equal to 200 MPa, greater than or equal to 30 MPa and less than or equal to 180 MPa, greater than or equal to 40 MPa and less than or equal to 160 MPa, greater than or equal to 50 MPa and less than or equal to 140 MPa, greater than or equal to 60 MPa and less than or equal to 120 MPa, or greater than or equal to 70 MPa and less than or equal to 100 MPa.

The polymeric marking carrier comprises a transmittance in the near-IR and LiDAR spectrum of electromagnetic radiation that is greater than or equal to 90%, such as greater than or equal to 91%, greater than or equal to 92%, greater than or equal to 93%, greater than or equal to 94%, greater than or equal to 95%, greater than or equal to 96%, greater than or equal to 97%, greater than or equal to 98%, or greater than or equal to 99%.

Dry LiDAR reflective material or powder can be applied using a gaseous marking carrier in the same manner as discussed above. For example, the LiDAR-reflective material can be applied to tag a surface for LiDAR visibility by a dry aerosol. In embodiments, the above-discussed membrane may encase dry LiDAR-reflective material—with or without a marking carrier—that can be delivered over a distance. Embodiments of the gaseous marking carrier will now be described.

In embodiments wherein the marking carrier is a gas, the gas may be selected from the group consisting of argon, nitrogen, oxygen, difluorochloromethane, dimethyl ether, methyl ethyl ether, tetrafluoroethane, heptafluoropropane, hydrofluoroolefin, chlorofluorocarbons, low-molecular weight hydrocarbons, butane, isobutene, propane, nitrous oxide, carbon dioxide, and combinations thereof. Non-limiting example uses of a gaseous marking carrier include thermal spraying processes wherein the gas is used to carry the dry LiDAR reflective material and/or provide energy source, such as for a flame, plasma, or the like.

In some embodiments, the marking carrier may be a combination of a fluid and a polymer or a fluid and a gas. Combining a fluid and a polymer can form a polymer gel that gives enhanced coverage and elasticity to a LiDAR-reflective film. Certain solvents can also be used to attenuate or enhance the fracture toughness of a polymer. The solvent can be subsequently removed. Combining a fluid and a gas may refine the sprayed particle size and result in a smoother finish with reduced grain size and thus reduced scattering loss of the reflected LiDAR radiation. Embodiments of the fluid-polymer marking carrier will now be described.

In embodiments wherein the marking carrier is a combination of a fluid and a polymer, the fluid may be selected from the group consisting of water, acetone, methyl ethyl ketone, methyl isobutyl ketone, methyl amyl ketones, isophorene, diacetone alcohol, diisobutyl ketone, ethyl acetate, butyl acetate, isopropyl acetate, isobutyl acetate, glycol ether esters, propylene glycol mono methyl ether acetate, ethanol, butanol, propanol, ethylene glycol monobutyl ether, ethylene glycol mono-n-propyl ether, diethylene glycol monobutyl ether, propylene glycol mono methyl ether, propylene glycol n-butyl ether, dipropylene glycol n-butyl ether, and combinations thereof; and the polymer is selected from the group consisting of gelatin, polyethylene terephthalate (PET), polystyrene, gelatin, nylon, polycarbonate, epoxy, phenol formaldehyde resin, urethane, polyesters, vinyl esters, polyethylene, polypropylene, polyvinyl chloride, polymethyl methacrylate, acrylonitrile-butadiene-styrene (ABS), polydimethylsiloxane, polysulfide, and combinations thereof. Non-limiting examples of fluid-polymer combinations include polyethylene glycol and water, polyurethane and dimethyl sulfoxide, polymethyl methacryate, polystyrene and ethyl acetate, and the like.

The fluid-polymer marking carrier comprises a transmittance in the near-IR and LiDAR spectrum of electromagnetic radiation that is greater than or equal to 90%, such as greater than or equal to 91%, greater than or equal to 92%, greater than or equal to 93%, greater than or equal to 94%, greater than or equal to 95%, greater than or equal to 96%, greater than or equal to 97%, greater than or equal to 98%, or greater than or equal to 99%.

Embodiments of the fluid-gas marking carrier will now be described.

In embodiments wherein the carrier is a combination of a gas and a fluid, the gas may be selected from the group consisting of argon, nitrogen, oxygen, difluorochloromethane, dimethyl ether, methyl ethyl ether, tetrafluoroethane, heptafluoropropane, hydrofluoroolefin, chlorofluorocarbons, low-molecular weight hydrocarbons, butane, isobutene, propane, nitrous oxide, carbon dioxide, and combinations thereof; and the fluid may be selected from the group consisting of water, acetone, methyl ethyl ketone, methyl isobutyl ketone, methyl amyl ketones, isophorene, diacetone alcohol, diisobutyl ketone, ethyl acetate, butyl acetate, isopropyl acetate, isobutyl acetate, glycol ether esters, propylene glycol mono methyl ether acetate, ethanol, butanol, propanol, ethylene glycol monobutyl ether, ethylene glycol mono-n-propyl ether, diethylene glycol monobutyl ether, propylene glycol mono methyl ether, propylene glycol n-butyl ether, dipropylene glycol n-butyl ether, and combinations thereof. Non-limiting exemplary uses of fluid-gas carrier include purging oxygen contained in solvents to reduce degradation of the LiDAR-reflective material, and the like.

Additionally, in embodiments, portions of the marking carrier may be physically blended with the LiDAR-reflective material and portions of the marking carrier may be chemically bonded with the LiDAR-reflective material. Particularly, where the marking carrier comprises a polymer portion and a fluid portion, the polymeric portion can be chemically bonded to the LiDAR-reflective material to form a polymer shell around the LiDAR-reflective material. In some instances, the polymer shell can be used as a surface modifier and allow the LiDAR-reflective core-shell particles to adhere to surfaces. In embodiments where such a polymer shell is formed around the LiDAR-reflective material, the polymer is capable of transmitting LiDAR radiation.

The Delivery System

The delivery system disclosed herein enables a tailored application of the LiDAR-reflective material to various kinds of surfaces for distinctive purposes. Non-limiting examples of surfaces include natural or synthetic textiles, paper, plastic, concrete or rock, metals, elastomers and the like.

The delivery system for applying the LiDAR-reflective material to selected surfaces comprises the LiDAR-reflective material and the marking carriers described above. The total weight ratio of marking carrier in the delivery system is greater than or equal to 0.01 wt % and less than or equal to 99 wt %, such as greater than or equal to 0.1 wt % and less than or equal to 99 wt %, greater than or equal to 1 wt % and less than or equal to 99 wt %, greater than or equal to 5 wt % and less than or equal to 99 wt %, greater than or equal to 10 wt % and less than or equal to 99 wt %, greater than or equal to 20 wt % and less than or equal to 99 wt %, greater than or equal to 40 wt % and less than or equal to 99 wt %, greater than or equal to 60 wt % and less than or equal to 99 wt %, greater than or equal to 80 wt % and less than or equal to 99 wt %, greater than or equal to 90 wt % and less than or equal to 99 wt %, greater than or equal to 95 wt % and less than or equal to 99 wt %, greater than or equal to 0.1 wt % and less than or equal to 80 wt %, greater than or equal to 1 wt % and less than or equal to 80 wt %, greater than or equal to 5 wt % and less than or equal to 80 wt %, greater than or equal to 10 wt % and less than or equal to 80 wt %, greater than or equal to 20 wt % and less than or equal to 80 wt %, greater than or equal to 40 wt % and less than or equal to 80 wt %, greater than or equal to 60 wt % and less than or equal to 80 wt %, greater than or equal to 0.1 wt % and less than or equal to 60 wt %, greater than or equal to 1 wt % and less than or equal to 60 wt %, greater than or equal to 5 wt % and less than or equal to 60 wt %, greater than or equal to 10 wt % and less than or equal to 60 wt %, greater than or equal to 20 wt % and less than or equal to 60 wt %, greater than or equal to 40 wt % and less than or equal to 60 wt %, greater than or equal to 0.1 wt % and less than or equal to 40 wt %, greater than or equal to 1 wt % and less than or equal to 40 wt %, greater than or equal to 5 wt % and less than or equal to 40 wt %, greater than or equal to 10 wt % and less than or equal to 40 wt %, greater than or equal to 20 wt % and less than or equal to 40 wt %, greater than or equal to 0.1 wt % and less than or equal to 20 wt %, greater than or equal to 1 wt % and less than or equal to 20 wt %, greater than or equal to 5 wt % and less than or equal to 20 wt %, greater than or equal to 10 wt % and less than or equal to 20 wt %, greater than or equal to 0.1 wt % and less than or equal to 10 wt %, greater than or equal to 1 wt % and less than or equal to 10 wt %, greater than or equal to 5 wt % and less than or equal to 10 wt %, greater than or equal to 0.1 wt % and less than or equal to 5 wt %, greater than or equal to 1 wt % and less than or equal to 5 wt %, or greater than or equal to 0.1 wt % and less than or equal to 3 wt %.

The delivery system of embodiments may further comprise additives, such as thickeners, stabilizers, emulsifiers, surfactants, plasticizers, binders, dispersing agent, and the like, to enhance properties of the marking carrier. Surfactants and emulsifiers can control and stabilize agglomeration or deagglomeration of the LiDAR-reflective materials in the delivery system. Thickeners and plasticizers can make rheological adjustment to the delivery system providing desirable processability, coverage, and stability of the LiDAR-reflective marking. Binders can enable the delivery system to be applied to the surface and, upon drying, form a film of the LiDAR-reflective material that adheres to the surface. Stabilizers can inhibit the degradation and extend the lifetime of the marking. Dispersing agent can improve the formation of particles or droplets of the LiDAR-reflective material in the delivery system and maintain the separation of the LiDAR-reflective particles or droplets in the delivery system to prevent their settling or clumping.

Non-limiting examples of thickeners include palygorskite, fumed silica, hydroxyethyl cellulose, methyl cellulose, fibrillated cellulose, methyl methacrylate, 2-ethylhexyl methacrylate, butanediol diacrylate, vinyl acetate, methacrylic acid esters, polyethylene glycol, gum, alginates, poly(butylene oxide), poly(ethylene oxide), and combinations thereof.

Non-limiting examples of stabilizers include tris(2,4-di-tert-butylphenyl)phosphite, butylate hydroxytoluene, nickel phenolates, calcium stearate, calcium oxide, zinc oxide, magnesium oxide, isothiazolinones, benzophenones, benzotriazoles, hydroxyphenyl-triazines, oxanilides, p-phenylenediamine, and combinations thereof.

Non-limiting example of surfactants include alcohol ethoxylate, sulfosuccinate, polyether siloxane, acetylene diol, polyoxyethylene glycol octylphenol ethers, polyoxyethylene glycol sorbitan alkyl esters, polyethylene glycol, polypropylene glycol, perfluorooctanesulfonate, lignosulonate, dioctyl sodium sulfosuccinate, and combinations thereof.

Non-limiting example of plasticizers include diisodecyl phthalate, diisoundecyl phthalate, ditridecyl phthalate, bis(2-ethylhexyl)adipate, dibutyl sebacate, butyl benzyl phthalate, bis(2-ethylhexyl) phthalate, diisononyl phthalate, bis(2-propylheptyl) phthalate, polycarboxylate, and combinations thereof.

Non-limiting example of binders include acrylic resins, alkyd resins, latex, phenolic resins, urethane resins, epoxy resins, and combinations thereof.

Non-limiting example of dispersing agents include sodium pyrophosphate, sodium citrate, sodium tartrate, sodium succinate, sodium polyacrylate, sodium polysulfonate, ammonium polyacrylate, ammonium citrate, glyceryl trioleate, phosphate ester, poly(acrylic acid), poly(methacrylic acid), poly(ethylene imine), and combinations thereof.

The total weight ratio of additives in the delivery system is greater than or equal to 0.1 wt % and less than or equal to 20.0 wt %, such as greater than or equal to 0.5 wt % and less than or equal to 18.0 wt %, greater than or equal to 1.0 wt % and less than or equal to 15.0 wt %, greater than or equal to 1.5 wt % and less than or equal to 12.0 wt %, greater than or equal to 1.0 wt % and less than or equal to 10.0 wt %, greater than or equal to 2.5 wt % and less than or equal to 8.0 wt %, or greater than or equal to 3.0 wt % and less than or equal to 5.0 wt %.

The delivery system according to embodiments may further comprise a propellant that enables pressurizing the delivery system and applying the delivery system in the forms of aerosols. Non-limiting examples of propellants include methane, propane, n-butane, isobutene, ethanol, kerosene, hydrogen, oxygen, nitrogen, nitrous oxide, carbon dioxide, chlorofluorocarbon dicholorodifuoromethane, diesel, gasoline, dimethyl ether, methyl ethyl ether, tetrafluoroethane, heptafluoropropane, hydrofluoroolefin, and combinations thereof.

The weight ratio of propellant in the delivery system of embodiments is greater than or equal to 5 wt % and less than or equal to 30 wt %, such as greater than or equal to 5 wt % and less than or equal to 20 wt %, greater than or equal to 5 wt % and less than or equal to 10 wt %, greater than or equal to 10 wt % and less than or equal to 30 wt %, greater than or equal to 10 wt % and less than or equal to 20 wt %, or greater than or equal to 20 wt % and less than or equal to 30 wt %.

In one or more embodiments, the delivery system may be pressurized with a working pressure that is greater than or equal to 1.5 atm and less than or equal to 8 atm, such as greater than or equal to 2 atm and less than or equal to 6 atm, or greater than or equal to 3 atm and less than or equal to 5 atm.

The delivery system may, according to embodiments, further comprise a regulator for adjusting the volume ratio of the LiDAR-reflecting material and the marking carrier, wherein the regulator comprises at least a gas, a fluid, or a combination thereof. In such embodiments, the gas comprises argon, nitrogen, oxygen, difluorochloromethane, dimethyl ether, methyl ethyl ether, tetrafluoroethane, heptafluoropropane, hydrofluoroolefin, chlorofluorocarbons, low-molecular weight hydrocarbons, butane, isobutene, propane, nitrous oxide, carbon dioxide, and combinations thereof; and the fluid comprises water, acetone, methyl ethyl ketone, methyl isobutyl ketone, methyl amyl ketones, isophorene, diacetone alcohol, diisobutyl ketone, ethyl acetate, butyl acetate, isopropyl acetate, isobutyl acetate, glycol ether esters, propylene glycol mono methyl ether acetate, ethanol, butanol, propanol, ethylene glycol monobutyl ether, ethylene glycol mono-n-propyl ether, diethylene glycol monobutyl ether, propylene glycol mono methyl ether, propylene glycol n-butyl ether, dipropylene glycol n-butyl ether, and combinations thereof.

Application

The method of application—marking a surface—with a LiDAR-reflective material disclosed herein comprises selecting a surface to be marked; applying the LiDAR-reflective material to the surface, wherein the LiDAR-reflective material comprises a reflectivity in the visible spectrum of electromagnetic radiation that is ≤10% and a reflectivity in the near-IR and LiDAR spectrum of electromagnetic radiation that is ≥10%. Specifically, embodiments of applying the LiDAR-reflective material to the surface comprises applying a delivery system comprising a LiDAR-reflective material and a marking carrier to the surface using an applicator, by spraying, by contacting an membrane encasing the LiDAR-reflective material with the surface, wherein the membrane fractures upon contact with the surface, or by combinations thereof. Non-limiting examples of applications according to embodiments include marking a surface with a unique design, pattern, image, or mark-such as a glyph, bar code or QR code—for purposes of identification, such as by using an applicator. One or more embodiments include marking a surface of large, freeform area by spraying for purposes of economic and efficiency consideration, and marking a surface with a membrane encasing the LiDAR-reflective material wherein the membrane fractures upon contact with the surface for purposes of mobile marking.

Embodiments of applying a delivery system comprising a LiDAR-reflective material and a marking carrier to surfaces using an applicator will now be described.

According to embodiments, the applicator may be selected from at least one of the group consisting of a stamp, a brush, a marker, a pen, a stylus, a roller, and a needle. According to embodiments, the applicator may be used to apply the delivery system comprising the LiDAR-reflective material, where the delivery system is in the form of solution, suspension, emulsion, gel, powder, film, fiber, filament or combinations thereof.

The applicator can apply the LiDAR-reflective material in various forms. Non-limiting examples include using a brush to apply the LiDAR-reflective material in a powder form to the surface, wherein the powder may be deposited to the surface by adhesion or electrostatic force; using a pen to apply the LiDAR-reflective material in a solution form to an absorptive surface such as paper, wherein the LiDAR-reflective material solute may be adsorbed to the surface or subsurface upon the evaporation of its solvent; using a stamp of a unique pattern to apply the LiDAR-reflective materials in a concentrated suspension form to a semi-absorbing surface such as leather, wherein the LiDAR-reflective material suspension may be deposited to the semi-absorbing surface displaying the unique pattern; using a roller to deposit the LiDAR-reflective material in a film to a surface, where the film may be adhere to the surface using an adhesive or using electrostatic force; or using a roller to spread the viscous LiDAR-reflective material to a non-absorptive surface, such as metal or plastic, where the viscous LiDAR-reflective material may stick to the surface. The applicator can be used to apply a unique marking to the surface such as a glyph, bar code, QR code, or the like that can be scanned by a LiDAR-detecting device but is not visible to the naked eye where the surface is dark-colored like the delivery system. This unique marking can provide the user scanning the unique marking with covert identifying information. In embodiments, the unique marking can link a user scanning the unique marking with a LiDAR-detecting device to additional information about the surface, such as by linking a QR code to a website.

Figure 1B:
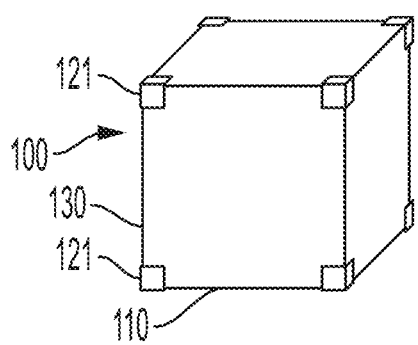
FIG. 1B graphically demonstrates LiDAR detection of a dark object may be enhanced by marking surface features of the dark object.
Figure 1B:
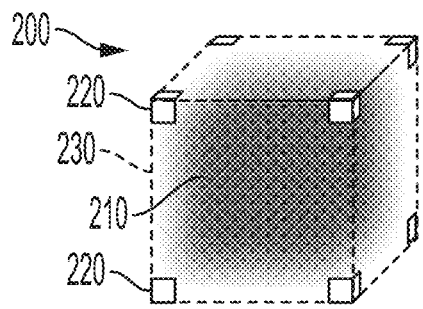
Figure 1C:
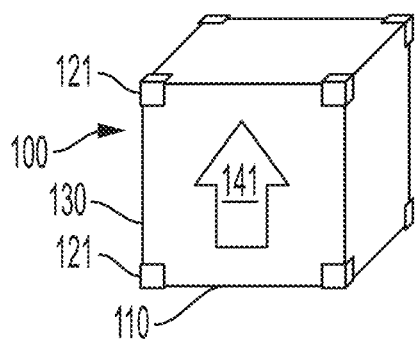
FIG. 1C graphically demonstrates LiDAR detection of a dark object may include identifying additional information (e.g. object orientation) by marking a pattern encoding the information.
Figure 1C:
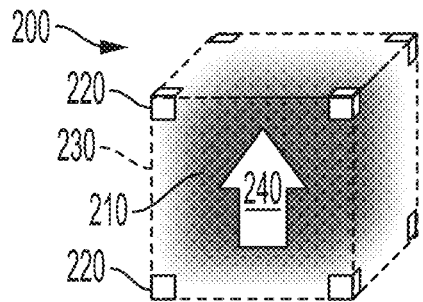

With reference to FIGS. 1A, 1B, and 1C, these figures provide illustrations of marking a surface of a dark-colored object 100 with LiDAR-reflective marks 121 or a LiDAR-reflective unique pattern 141 for the purposes of enhanced LiDAR detection or identification. For example, as shown in FIG. 1A, the cubic object 100 has a dark-colored surface 110, corners 120, and edges 130 when viewed by the human eye. However, because the dark-colored surface 110 absorbs LiDAR light and reduces the intensity of LiDAR reflection, the LiDAR sensors mischaracterize the cubic object 100 and detect an obscured object 200 with a surface 210, or do not detect the dark-colored object 100 at all.

To provide or enhance the LiDAR detection of the cube 100, the cube 100's corners 120 may be marked with LiDAR-reflective marks 121 formed by a LiDAR-reflective delivery system as disclosed herein, as shown in FIG. 1B (left). LiDAR-reflective marks 121 reflect LiDAR radiation and enable the identification of the corners 220 of the detected object 200, as shown in FIG. 1B (right), by a LiDAR-detecting device. However, the marked corners 121 are not discernable by the human eye from the dark-colored surface 110. Based on the surface 210 and corners 220 observed by a LiDAR-detecting device, the edges 230 of the detected object 200 can be anticipated. With its surface 210, corners 220, and edges 230 identified, the LiDAR-detected object 200 accurately depicts the cubic object 100.

Further, the surface 110 of the cubic object 100 can be marked with a unique LiDAR-reflective pattern 141, as shown in FIG. 1C. The unique LiDAR-reflective pattern 141 has a unique pattern that contains information. For example, but without limitation, the unique LiDAR-reflective pattern 141 may be an arrow identifying the orientation of the object 100, a QR code identifying the content contained within the object 100, a trademark, or other information-containing pattern that may communicate a message to a robot, autonomous vehicle, or other observer using a LiDAR-detecting device. It should be understood that although the unique LiDAR-reflective pattern (arrow) 141 shown in FIG. 1C is light-colored, this is for illustrative purposes only and the unique LiDAR-reflective pattern 141 would not be discernable from the dark-colored surface 110 by the unaided human eye. The unique LiDAR-reflective pattern 141 reflects LiDAR light and enables LiDAR sensors to identify the mark 240 on the surface 210 of the detected object 200 and the information contained within.

Additionally, the unique LiDAR-reflective pattern 141 may, in embodiments, be an information encoding pattern wherein information is encoded by letters, images, barcodes, glyphs, QR codes, or any other format. As illustrated in FIG. 1C, the unique LiDAR-reflective pattern 141 may provide information, such as the object's orientation or identification, and allow a LiDAR-detecting device to detect the object's orientation or identity. Embodiments of applying the delivery system comprising the LiDAR-reflective material and the marking carrier to surfaces by spraying will now be described.

The method of spraying the LiDAR-reflective material may further comprise introducing a propellant to the delivery system, regulating the volume ratio of the LiDAR-reflective material and the marking carrier, pressurizing the delivery system, or combinations thereof. The method of spraying is applicable to the LiDAR-reflective material in various forms. Non-limiting examples include an aerosol spray of a suspending fluid of the LiDAR-reflective material or an aerosol spray of a dry powder of the LiDAR-reflective material. Spraying to apply the LiDAR-reflective material enables large-area surface marking. Non-limiting examples include spraying the LiDAR-reflective material to portions of surfaces of a dark-colored object (e.g. door or body panels of a dark-colored vehicle) to improve LiDAR detection and thus road safety or to portions of surfaces of a structure or building material (e.g. a supporting column or a rebar) for non-contact or non-destructive structural health and fatigue monitoring including surface crack, deformation, erosion, and more.

Spraying may be carried out using at least one of the group consisting of an air sprayer, a powder electrostatic sprayer, a powder sprayer, an ultrasonic spray coater, a plasma spray coater, and an electric arc spray coater. For example, but without limitation, a LiDAR-reflective material in the form of fiber can be sprayed to form nonwoven fabrics. In addition, LiDAR-reflective fiber can also be sprayed to the surface of a textile article followed by flock printing process and form a LiDAR-reflective fabric.

Embodiments of applying the LiDAR-reflective material to a surface by contacting a membrane encasing the LiDAR-reflective material, wherein the membrane fractures upon contact with the surface, will now be described. The enclosed LiDAR-reflective material may be in the form of solution, suspension, emulsion, gel, powder, film, fiber, filament or combinations thereof.

Contacting the membrane with the surface may be achieved by physically tossing or mechanically launching the membrane-encased LiDAR-reflective material. Upon contact, the impact force fractures the membrane and releases the encased LiDAR-reflective material, thereby marking the surface of contact. The mechanical launching may be achieved by a pressurized delivery device that allows an article or surface to be marked by the LiDAR-reflective material from a distance, or by a sling, catapult, trebuchet, bow, or the like.

The impact force required to fracture the membrane depends on the membrane's elasticity and brittleness, which may be varied with the membrane's composition. As discussed above, in embodiments, the membrane is selected from the group consisting of gelatin, polyethylene terephthalate (PET), polystyrene, gelatin, nylon, polycarbonate, epoxy, phenol formaldehyde resin, urethane, polyesters, vinyl esters, polyethylene, polypropylene, polyvinyl chloride, polymethyl methacrylate, acrylonitrile-butadiene-styrene (ABS), polydimethylsiloxane, polysulfide, and combinations thereof. The elasticity of these polymeric materials can be modified using plasticizers including, but without limiting, diisodecyl phthalate, diisoundecyl phthalate, ditridecyl phthalate, bis(2-ethylhexyl)adipate, dibutyl sebacate, butyl benzyl phthalate, bis(2-ethylhexyl) phthalate, diisononyl phthalate, bis(2-propylheptyl) phthalate, polycarboxylate, and combinations thereof.

Additionally, the method of marking a surface with the LiDAR-reflective material may further comprise applying the LiDAR-reflective material to the surface by printing the LiDAR-reflective material on a sheet, wherein the printed LiDAR-reflective mark has a unique design. The unique design may be a glyph, bar code, QR code or other information-containing pattern that may communicate a message to a robot, autonomous vehicle, or other observer. The sheet can be removed or dissolved by water. Upon the removal of the sheet, the unique LiDAR-reflective mark is transferred to the surface.

In addition, the dark-colored LiDAR marking may be used for security purposes by having intricate designs on dark-colored objects that are not perceivable by the unaided eye, but are perceivable with a LiDAR detecting device. Similarly, articles or structures (such as trees, dilapidated structures and vehicles and the like) may be marked by the systems disclosed herein and targeted by a LiDAR detecting device, such as a robot or drone. For instance, a dark-colored landing pad marked by delivery systems described herein could be detected by a drone using a LiDAR detecting device.

EXAMPLES

Embodiments will now be further clarified by the following examples

Example 1

The reflectance behavior of paint samples incorporated with dark-colored pigments are compared. Samples include two types of CuO crystallites: N—CuO-A has a crystal size about 100 Å and a (111)/(−111) ratio near 1. N—CuO—C has a crystal size about 204 Å and a (111)/(−111) ratio near 1.1. Chromium iron oxide based near infrared (NIR) reflective black pigments, HEUCODUR HD 910, was obtained from Heucotech LTD (denoted as "cool black"). Carbon black, MONARCH900, was obtained from Cabot Corporation (denoted as "carbon black").

Crystallographic information of CuO nanoparticles were investigated using powder X-ray diffraction (XRD, Japan, Rigaku Miniflex 600) with Cu Kα radiation (2=0.1541 nm). The average crystallite size τ of prepared particles was estimated from the measured width of their XRD diffraction curves by using Scherrer's formula.

$$\tau = \frac{k\lambda}{\beta \cos\theta} \quad (2)$$

Here k is a dimensionless shape factor with a value close to unity. λ represents the wavelength of the X-ray radiation, β is the line broadening at half the maximum intensity (FWHM) and θ is the Bragg's angle.

Optical properties of painted panels were studied by UV/Vis/NIR spectrophotometers (USA Agilent Cary 7000). The bandgap calculation is based on the Kubelka-Munk function $F(R_\infty)$ which is related to the diffuse reflectance, $R_\infty$, of the sample by the relation below:

$$F(R_\infty) = (1 - R_\infty)^2 / 2R_\infty \quad (3)$$

Here, $R_\infty$ is the absolute value of reflectance and $F(R_\infty)$ is equivalent to the absorption coefficient. The indirect bandgap of samples was estimated by plotting $(F(R\_\infty)h\nu)^{0.5}$ versus energy. The linear part of the curve was extrapolated to $(F(R\_\infty)h\nu)^{0.5}=0$ to obtain the indirect bandgap energy.

The degree of blackness $M_y$ of painted samples was evaluated by X-Rite Ci7600 benchtop spectrophotometer (USA, X-Rite) that directly related to the reference provided by the instrument.

$$M_Y = 100\log(Y_n/Y) \quad (4)$$

Where $Y_n$=100.000 is one of the CIE White Point values for D65/10 conditions. Y are one of the CIE tristimulus values for the sample being measured.

Figure 2:
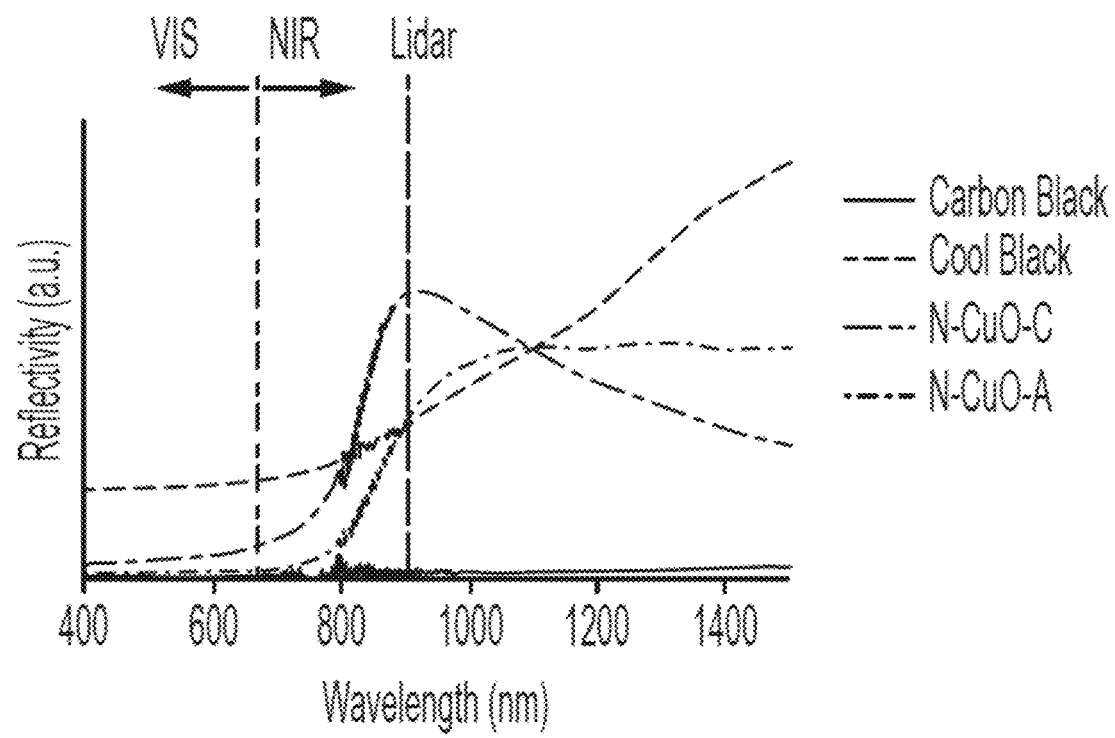
FIG. 2 graphically depicts the reflectivity of carbon black, commercial "cool black", commercial N—CuO—C and N—CuO-A pigment, versus wavelength.
Figure 3:
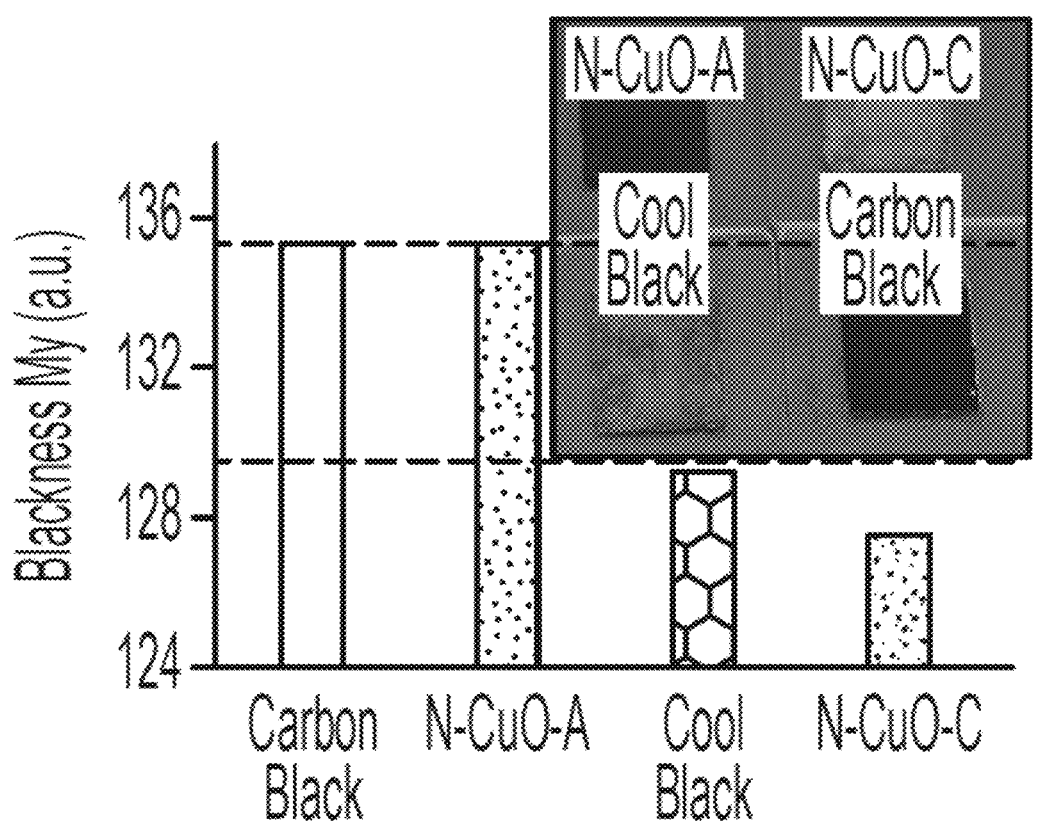
FIG. 3 depicts the blackness $M_y$ value of paints incorporated with carbon black, commercial "cool black", commercial N—CuO—C and N—CuO-A pigment, respectively, and the insert photo reveals the blackness difference of these four samples.

The reflectance spectra depicted in FIG. 2 shows that the paint sample incorporated with N—CuO-A offers an elegant black color with nearly full absorption in visible light, which is similar to carbon black, but retains NIR reflectivity with the maximum peak close to 905 nm. The measure of blackness shows a $M_y$ value as high as 135.5, as shown in FIG. 3. Comparatively, a paint containing carbon black exhibits very low reflection (less than 1%) throughout the visible and NIR wavelength, resulting in a high blackness value of around 135. Paints with N—CuO—C have higher NIR reflectivity selectively between 900 and 1000 nm, but they show distinguishable reflection in the visible wavelength, particularly in red hue, resulting in the appearance of an obvious brownish tone, with a blackness value less than 130. In contrast, the "cool black" sample shows strong reflection at the deeper end of the NIR spectra greater than 905 nm yet does not sufficiently absorb in the visible wavelengths, with a blackness value of 128. The insert photo in FIG. 3 reveals the difference in blackness of these raw pigment samples, which agrees well with the reflectance spectra in visible range as paint samples shown in FIG. 3.

Example 2

The N—CuO-A crystallites were mixed with polyurethane resin at a powder/resin ratio of 1:4, and then applied via a doctor blade with wet film-thickness of 200 μm (or 8 mil) onto a steel panel surface with pre-coated half-black (reflectance—1% maximum) and half-white (reflectance—78% minimum) surfaces. Then a transparent clear coat of 60 μm in dry film thickness was applied over the samples resembling automotive paint system.

Example 3

Figure 4A:
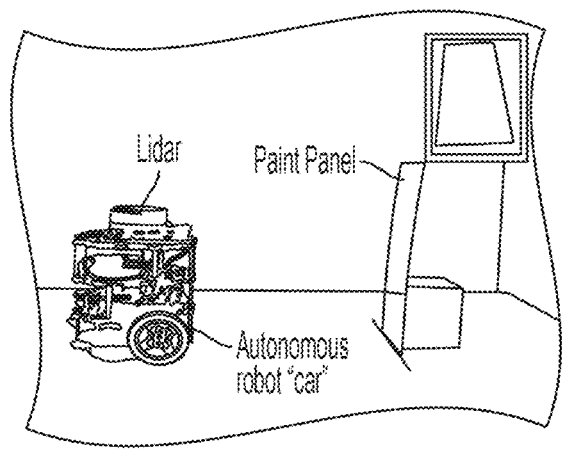
FIG. 4A is a schematic of a demonstration set-up using robot car equipped with 2D laser scanner at 905 nm, mimicking an autonomous driving car.
Figure 4B:
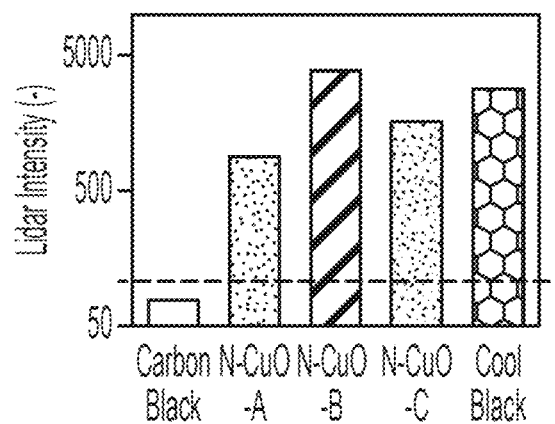
FIG. 4B depicts a comparison of LiDAR intensity obtained by robot car at 8° from painted panels incorporated with carbon black, N—CuO-A, N—CuO—B, commercial N—CuO—C and cool black pigments, respectively.
Figure 4C:
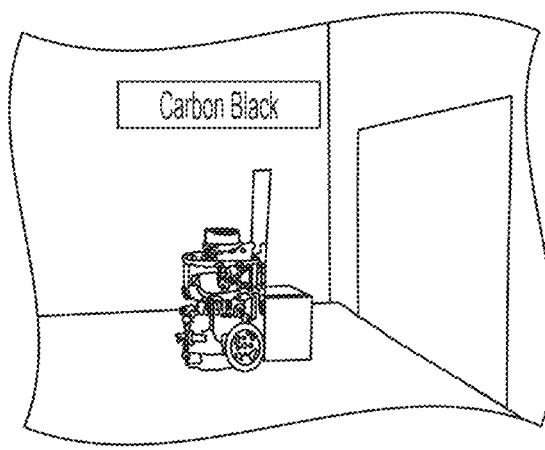
FIG. 4C is a schematic of a demonstration of robot car hitting carbon black based painted panel with threshold of LiDAR intensity set as 100.
Figure 4D:
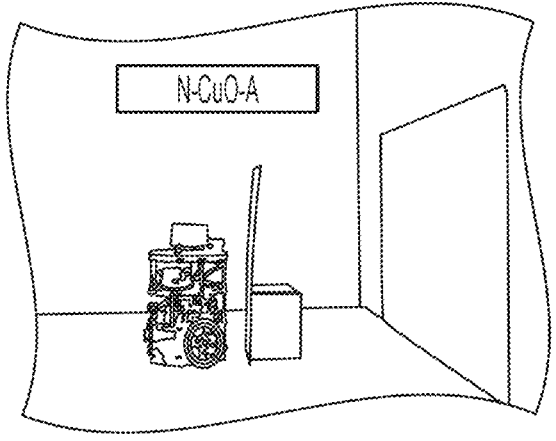
FIG. 4D is a schematic of a demonstration of robot car stopping in front of painted panel incorporated with N—CuO-A pigment with threshold of LiDAR intensity set as 100.

To validate the LiDAR reflective performance of N—CuO-A crystallites, a robot car (Model TurtleBot 3 Burger) equipped with a 2D laser scanner at 905 nm was used to mimic an autonomous driving car. The laser scanner is capable of sensing 360 degrees that collects a set of data around the robot to use for SLAM (Simultaneous Localization and Mapping) and Navigation, as well as performing stop when obstacle is detected. FIG. 4A shows the set up where a paint panel was placed in front of autonomous robot car each time and inset figure shows the prepared N—CuO-A painted panel which appears identical to carbon black paint. The intensity of LiDAR sensor reflected by the panel and recorded on the screen, if the distance and angle are fixed, are solely proportional to the reflectivity intensity of the panels at 905 nm. The detected LiDAR intensity values on the sensor were recorded via Bluetooth in FIG. 4B when the tested panels were placed in front of the robot car at a fixed distance of 6 inches and a fixed angle (8°). It clearly reveals that N—CuO-A painted panels have significantly higher LiDAR intensity (nearly 1500%) than that made of carbon black panels. Accordingly, the LiDAR reflectivity from the N—CuO-A paint sample is enough for the robot car to detect and to perform an automatic "stop", as shown in FIG. 4D, while it would "bump" onto the carbon black panel due to near full absorption in near-IR wavelengths as shown in FIG. 4C.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of marking a surface with a marking material, the method comprising:
    selecting a surface to be marked;
    applying the marking material to the surface, wherein the marking material comprises:
        a LiDAR-reflective material; and
        a marking carrier, and
    the LiDAR-reflective material comprises:
        an average particle size that is from 5 nm to 15 nm;
        a blackness My that is from 130 to 170;
        a reflectivity in the visible spectrum of electromagnetic radiation that is ≤10%; and
        a reflectivity in the near-IR and LiDAR spectrum of electromagnetic radiation that is ≥10%.

2. The method of claim 1, wherein applying the LiDAR-reflective material to the surface comprises spraying the surface with the LiDAR-reflective material.

3. The method of claim 1, wherein applying the LiDAR-reflective material to the surface comprises applying the LiDAR-reflective material on the surface with an applicator.

4. The method of claim 3, wherein the applicator is selected from at least one of the group consisting of a stamp, a brush, a marker, a pen, a stylus, a roller, and a needle.

5. The method of claim 1, wherein applying the LiDAR-reflective material to the surface comprises:
    contacting a membrane encasing the LiDAR-reflective material to the surface, wherein the membrane is selected from the group consisting of gelatin, polyethylene terephthalate (PET), polystyrene, gelatin, nylon, polycarbonate, epoxy, phenol formaldehyde resin, urethane, polyesters, vinyl esters, polyethylene, polypropylene, polyvinyl chloride, polymethyl methacrylate, acrylonitrile-butadiene-styrene (ABS), polydimethylsiloxane, polysulfide, or a combination of two or more thereof; and
    fracturing the membrane upon contact with the surface.

6. The method of claim 1, wherein the LiDAR-reflective material is applied to the surface as a unique marking design.

7. The method of claim 6, wherein the unique marking design is a glyph, bar code, or QR code.

8. A marking composition, comprising:
    a LiDAR-reflective material; and
    a marking carrier,
    wherein the LiDAR-reflective material comprises:
    an average particle size that is from 5 nm to 15 nm;
    a blackness My that is from 130 to 170;
    a reflectivity in the visible spectrum of electromagnetic radiation that is ≤10%; and
    a reflectivity in the near-IR and LiDAR spectrum of electromagnetic radiation that is ≥ 10%.

9. The marking composition of claim 8, wherein the marking composition is encased in a membrane selected from the group consisting of gelatin, polyethylene terephthalate (PET), polystyrene, gelatin, nylon, polycarbonate, epoxy, phenol formaldehyde resin, urethane, polyesters, vinyl esters, polyethylene, polypropylene, polyvinyl chloride, polymethyl methacrylate, acrylonitrile-butadiene-styrene (ABS), polydimethylsiloxane, polysulfide, and combinations thereof.

10. The marking composition of claim 8, wherein the composition further comprises a propellant selected from the group consisting of difluorochloromethane, dimethyl ether, methyl ethyl ether, tetrafluoroethane, heptafluoropropane, hydrofluoroolefin, low-molecular weight hydrocarbons, butane, isobutene, propane, nitrous oxide, carbon dioxide, nitrogen, and combinations thereof.

11. The marking composition of claim 8, wherein the marking carrier is a gas selected from the group consisting of argon, nitrogen, oxygen, difluorochloromethane, dimethyl ether, methyl ethyl ether, tetrafluoroethane, heptafluoropropane, hydrofluoroolefin, chlorofluorocarbons, low-molecular weight hydrocarbons, butane, isobutene, propane, nitrous oxide, carbon dioxide, and combinations thereof.

12. The marking composition of claim 11, wherein the LiDAR-reflective material comprises a dark-colored pigment selected from the group consisting of CuO crystallites, carbon black, chromium iron oxide and its derivatives, or a combination of two or more thereof.

13. The marking composition of claim 12, wherein the dark-colored pigment comprises CuO crystallites with a ratio of (−111)/(111) intensity that is from 0.5 to 1.5.

14. The marking composition of claim 12, wherein the dark-colored pigment comprises CuO crystallites with a ratio of (−111)/(111) intensity that is from 0.9 to 1.1.

15. The marking composition of claim 8, wherein the marking carrier is a fluid selected from the group consisting of water, acetone, methyl ethyl ketone, methyl isobutyl ketone, methyl amyl ketones, isophorene, diacetone alcohol, diisobutyl ketone, ethyl acetate, butyl acetate, isopropyl acetate, isobutyl acetate, glycol ether esters, propylene glycol mono methyl ether acetate, ethanol, butanol, propanol, ethylene glycol monobutyl ether, ethylene glycol mono-n-propyl ether, diethylene glycol monobutyl ether, propylene glycol mono methyl ether, propylene glycol n-butyl ether, dipropylene glycol n-butyl ether, and combinations thereof.

16. The marking composition of claim 8, wherein the marking carrier is a polymer selected from the group consisting of gelatin, polyethylene terephthalate (PET), polystyrene, gelatin, nylon, polycarbonate, epoxy, phenol formaldehyde resin, urethane, polyesters, vinyl esters, polyethylene, polypropylene, polyvinyl chloride, polymethyl methacrylate, acrylonitrile-butadiene-styrene (ABS), polydimethylsiloxane, polysulfide, and combinations thereof.

17. The marking composition of claim 8, wherein the marking carrier is a combination of a gas and a fluid, wherein
    the gas is selected from the group consisting of argon, nitrogen, oxygen, difluorochloromethane, dimethyl ether, methyl ethyl ether, tetrafluoroethane, heptafluoropropane, hydrofluoroolefin, chlorofluorocarbons, low-molecular weight hydrocarbons, butane, isobutene, propane, nitrous oxide, carbon dioxide, and combinations thereof; and the fluid is selected from the group consisting of water, acetone, methyl ethyl ketone, methyl isobutyl ketone, methyl amyl ketones, isophorene, diacetone alcohol, diisobutyl ketone, ethyl acetate, butyl acetate, isopropyl acetate, isobutyl acetate, glycol ether esters, propylene glycol mono methyl ether acetate, ethanol, butanol, propanol, ethylene glycol monobutyl ether, ethylene glycol mono-n-propyl ether, diethylene glycol monobutyl ether, propylene glycol mono methyl ether, propylene glycol n-butyl ether, dipropylene glycol n-butyl ether, and combinations thereof.

18. The marking composition of claim 8, wherein the marking carrier is a combination of a fluid and a polymer, wherein the fluid is selected from the group consisting of water, acetone, methyl ethyl ketone, methyl isobutyl ketone, methyl amyl ketones, isophorene, diacetone alcohol, diisobutyl ketone, ethyl acetate, butyl acetate, isopropyl acetate, isobutyl acetate, glycol ether esters, propylene glycol mono methyl ether acetate, ethanol, butanol, propanol, ethylene glycol monobutyl ether, ethylene glycol mono-n-propyl ether, diethylene glycol monobutyl ether, propylene glycol mono methyl ether, propylene glycol n-butyl ether, dipropylene glycol n-butyl ether, and combinations thereof; and the polymer is selected from the group consisting of gelatin, polyethylene terephthalate (PET), polystyrene, gelatin, nylon, polycarbonate, epoxy, phenol formaldehyde resin, urethane, polyesters, vinyl esters, polyethylene, polypropylene, polyvinyl chloride, polymethyl methacrylate, acrylonitrile-butadiene-styrene (ABS), polydimethylsiloxane, polysulfide, and combinations thereof.

19. The marking composition of claim 8, wherein the LiDAR-reflective material comprises an average particle size that is from 8 nm to 12 nm.

20. The marking composition of claim 8, wherein the LiDAR-reflective material comprises a blackness $M_y$ that is from 150 to 170.

21. The marking composition of claim 8, wherein the LiDAR-reflective material comprises a reflectivity in the visible spectrum of electromagnetic radiation that is ≤5%.

22. The marking composition of claim 8, wherein the LiDAR-reflective material comprises a reflectivity in the near-IR and LiDAR spectrum of electromagnetic radiation that is ≥20%.

* * * * *